United States Patent [19]

Pellegatti et al.

[11] Patent Number: 5,453,466
[45] Date of Patent: Sep. 26, 1995

[54] POLYOLEFIN COMPOSITIONS HAVING HIGH BALANCE OF STIFFNESS AND IMPACT STRENGTH

[75] Inventors: Giampaolo Pellegatti, Ferrara; Anteo Pelliconi, Rovigo; Antonio Ciarrocchi, Ferrara, all of Italy

[73] Assignee: Montell North America Inc., Wilmington, Del.

[21] Appl. No.: 298,445

[22] Filed: Aug. 29, 1994

[30] Foreign Application Priority Data

Aug. 30, 1993 [IT] Italy ................... MI93A1861

[51] Int. Cl.[6] ............ C08L 23/10; C08L 23/04; C08L 23/16; C08K 3/00
[52] U.S. Cl. ............ 525/240; 524/427; 524/451; 524/505; 524/528; 525/236; 525/237; 525/242; 525/322; 525/323
[58] Field of Search ............ 524/528, 451, 524/427, 505; 525/236, 237, 240, 242, 322, 323

[56] References Cited

U.S. PATENT DOCUMENTS

| | | | |
|---|---|---|---|
| 4,188,350 | 2/1980 | Vicik et al. | 525/240 |
| 4,621,114 | 11/1986 | Watanabe | 524/505 |
| 4,748,206 | 5/1988 | Nogiwa et al. | 525/240 |
| 5,001,182 | 3/1991 | Maruya et al. | 524/451 |
| 5,212,246 | 5/1993 | Ogale | 525/240 |
| 5,298,561 | 3/1994 | Cecchin et al. | 525/240 |
| 5,338,801 | 8/1994 | Eppert, Jr. | 525/240 |

*Primary Examiner*—Paul R. Michl
*Assistant Examiner*—Alga Asinovsky

[57] ABSTRACT

Disclosed are polyolefin compositions having high balance of stiffness and impact strength, which comprise (percentage by weight):

A) 30%–60% of a propylene homopolymer or copolymer;
B) 14%–30% of a fraction comprising copolymers of propylene with ethylene;
C) 10%–25% of a copolymer of ethylene with a $C_3$–$C_8$ α-olefin;
D) 5%–45% of a mineral filler.

10 Claims, No Drawings

POLYOLEFIN COMPOSITIONS HAVING HIGH BALANCE OF STIFFNESS AND IMPACT STRENGTH

The present invention relates to polyolefin compositions comprising a crystalline propylene polymer or copolymer, and olefin copolymers.

It is known that crystalline propylene polymers possess good characteristics in terms of stiffness, processability in the molten state, heat resistance and resistance to atmospheric agents and to solvents. Also known is that their poor impact resistance (resilience), particularly at low temperatures, can be improved by adding copolymers of ethylene with α-olefins (such as propylene or 1-butene). Polyolefin compositions of this type comprising crystalline polypropylene, optionally containing ethylene/propylene copolymers and one or more additional copolymers of ethylene with an α-olefin (such as propylene or 1-butene), are described in U.S. Pat. No. 5,001,182, and in published European patent applications 496625 and 519725. Said compositions find application above all in the automotive field (e.g bumpers and side strips).

U.S. Pat. No. 5,001,182 describes in particular polyolefin compositions comprising, besides a so called propylene/ethylene "block copolymer" (made up of a blend of polypropylene and ethylene/propylene copolymers), an additional low-crystallinity copolymer of ethylene with an α-olefin, and a filler selected from talc and calcium carbonate.

The polyolefin compositions described in published European patent applications 496625 and 519725, besides a propylene polymer which can be a block copolymer of the type described above, comprise also a low-crystallinity ethylene-propylene rubber (such as EPR or EPDM preferably containing 12 to 30% by weight of propylene), and a high-crystallinity copolymer of ethylene with an α-olefin (such as LLDPE or VLDPE). According to European application 496625, said compositions comprise from 7 to 25 parts by weight of talc per 100 parts by weight of polymer, while according to European application 519725 talc is present in quantities ranging from 0 to 7 parts by weight per 100 parts by weight of polymer.

The above compositions present satisfactory Izod impact resistance values at low temperatures (−30°/−40° C.).

However, the examples in U.S. Pat. No. 5,001,182 and European applications 496625 and 519725, show that for Izod values at low temperatures around 7–8 Kg cm/cm (equivalent to 70–80 J/m) the corresponding flexural modulus values, which indicate the stiffness of the compositions, do not reach 13000 Kg/cm$^2$ (equivalent to about 1300 MPa).

Now according to this invention polyolefin compositions have been perfected with an improved balance of flexural modulus and Izod impact strength.

The present invention provides polyolefin compositions comprising (percentages by weight):
A) 30%–60% of a propylene homopolymer or copolymer soluble in xylene at ambient temperature in a percentage lower than or equal to 5% preferably to 4%;
B) 14%–30% of a fraction consisting of copolymers of propylene with ethylene, said fraction containing from 40% to 60%, preferably from 50% to 60%, of propylene, and being soluble in xylene at ambient temperature in a percentage ranging from 60% to 99%, preferably from 70% to 99%;
C) 10%–25% of a copolymer of ethylene with a $C_3$–$C_8$ α-olefin in a quantity ranging from 10% to 30%, preferably from 10% to 20%, said copolymer being soluble in xylene at ambient temperature in a percentage ranging from 10% to 50%, preferably from 10% to 40%;
D) 5%–45%, preferably 5%–25%, of a mineral filler in particle form having an average diameter ranging from 0.1 to 5 micrometers, preferably selected from talc, calcium carbonate, silica, clays, diatomaceous earths, titanium oxide and zeolites.

The average diameter of component D) is measured by means of a SEDIGRAPH 5100, and corresponds to the average diameter of the ideal sphere equivalent to the volume of the particles.

Component A) is preferably a propylene homopolymer, more preferably a homopolymer soluble in xylene at ambient temperature for a percentage lower than or equal to 3% by weight. When said component is a propylene copolymer, the comonomer is selected from ethylene and $C_4$–$C_8$ α-olefins. Preferably said comonomer is present in quantities ranging from 0.5% to 5% by weight, more preferably from 0.5% to 3% by weight.

Examples of $C_4$–$C_8$ α-olefins which can be present in component A), and $C_3$–$C_8$ α-olefins which can be present in component C) of the compositions of the present inventions are: propylene; 1-butene; 1-pentene; 1-hexene; 4-methyl-1-pentene; 1-octene. The preferred one is 1-butene.

Component B) generally comprises an essentially linear copolymer of ethylene with propylene, which substantially corresponds to the fraction insoluble in xylene at ambient temperature, which is present in amount of from 1% to 40%, preferably from 1% to 30%, and an amorphous copolymer of propylene with ethylene containing from about 45% to 65%, preferably from 55% to 65% by weight of propylene.

Moreover, the melt flow rate (MFR) of the blend of components A), B), and C), preferably ranges from 5 to 50 g/10 min., more preferably from 10 to 30 g/10 min.

Typically the compositions of the present invention have Izod impact values at −30° C. ranging from 70 to 90 J/m and flexural modulus values from 1300 to 1600 MPa, preferably from 1350 to 1600 MPa, more preferably from 1400 to 1600 MPa.

The compositions of the present invention can be prepared for instance by sequential polymerization processes based on the use of particular Ziegler-Natta catalysts, producing in polymerization a mixture of components A), B) and C), and then adding component D) by blending.

Independently from the method used to produce the above mentioned mixture, it preferably contains the three components in the following proportions (percentages by weight):
 component A) from 35% to 70%;
 component B) from 15% to 40%;
 component C) from 11% to 30%.

As essential element, the above catalysts contain a solid catalyst component, which comprises a titanium compound having a titanium-halogen bond and an electron-donor compound supported on an active magnesium halide, and are characterized in that they are capable of producing polypropylene with an isotactic index (measured as insoluble in xylene at ambient temperature) higher than or equal to 96%, preferably higher than or equal to 97%. Catalysts having the above mentioned characteristics are well known in patent literature.

Particularly suitable are the catalysts described in U.S. Pat. No. 4,339,054, and European patent 45,977. Other examples of catalysts are described in U.S. Pat. Nos 4,472, 524 and 4,473,660.

Generally the solid catalyst components used in these catalysts comprise as electron-donor compounds, compounds selected from ethers, ketones, lactones, compounds containing N, P, and/or S atoms, and esters of mono- and dicarboxylic acids.

Particularly suitable are the phthalic acid esters such as diisobutyl, dioctyl, diphenyl, and benzylbutyl phthalate; the esters of malonic acid such as diisobutyl and diethyl malonate; alkyl and aryl pivalates; alkyl, cycloalkyl and aryl maleates; alkyl and aryl carbonates, such as diisobutyl carbonate, ethylphenyl carbonate and diphenyl carbonate; the esters of succinic acid such as mono- and diethyl succinate.

Other electron-donors particularly suitable are 1,3-diethers of formula

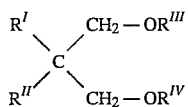

wherein $R^I$ and $R^{II}$ are the same or different and are alkyl, cycloalkyl, or aryl radicals with 1–18 carbon atoms; $R^{III}$ or $R^{IV}$ are the same or different and are alkyl radicals with 1–4 carbon atoms. Ethers of this type are described in published European patent application EP-A-361 493. Examples of said compounds are 2-methyl-2-isopropyl-1,3-dimethoxypropane, 2,2-diisobutyl-1,3-dimethoxypropane, 2-isopropyl-2-cyclopentyl-1,3-dimethoxypropane.

The preparation of the above mentioned catalyst components is carried out using various methods.

For example the magnesium halide in an anhydrous state containing less that 1% water, the titanium compound and the electron-donor compound can be milled together under conditions which cause the magnesium halide to become active; the milled product is then treated one or more times with TiCl$_4$ in excess at from 80° to 135° C. and then washed repeatedly with a hydrocarbon (hexane, for example) until all chlorine ions have disappeared.

According to another method, the anhydrous magnesium halide is preactivated according to known methods and then reacted with an excess of TiCl$_4$ containing the electron-donor compound in solution. In this case too the operation takes place at a temperature ranging from 80° to 135° C. Optionally the treatment with TiCl$_4$ is repeated and the solid is then washed with hexane to eliminate all traces of unreacted TiCl$_4$.

According to another method, a MgCl$_2$.nROH adduct (particularly in spheroidal particle form) wherein n is usually from 1 to 3 and ROH is ethanol, butanol or isobutanol, is reacted with an excess of TiCl$_4$ containing the electron-donor compound in solution. The temperature ranges generally from 80° to 120° C. Afterwards the solid is separated and reacted once again with TiCl$_4$, then it is separated and washed with hydrocarbon until all chorine ions have disappeared.

According to another method, magnesium alcoholates and chloroalcoholates (the latter prepared for instance as described in U.S. Pat. No. 4,220,554), are reacted with TiCl$_4$ in excess containing the electron-donor compound in solution, operating in this case too under the reaction conditions described above.

The titanium compound expressed as Ti is generally present in the solid catalyst component in a percentage ranging from 0.5 to 10% by weight; the quantity of electron-donor compound which remains set on the solid component (internal donor) generally ranges from 5 to 20% in moles with respect to the magnesium dihalide.

Titanium compounds which can be used for the preparation of catalyst components are halides and halogen alcoholates. Titanium tetrachloride is the preferred compound.

Satisfactory results are obtained also with titanium trihalides, particularly TiCl$_3$HR, TiCl$_3$ARA, and with halogen alcoholates such as TiCl$_3$OR, wherein R is a phenyl radical.

The reactions mentioned above cause the formation of magnesium halide in active form. Besides these reactions, also well known in the literature are other reactions which lead to the formation of magnesium halide in active form starting from magnesium compounds which are different from the halides, such as magnesium carboxylates for example.

The active form of magnesium halides in solid catalyst components is recognizable by the fact that in the X-rays spectrum of the catalyst component the major intensity reflection which appears in the spectrum of the nonactivated magnesium halides (having surface area smaller than 3 m$^2$/g) is no longer present, but in its place there is a halo with the maximum intensity shifted with respect to the position of the major intensity reflection of the nonactivated magnesium halide; as an alternative, said active form can be recognized by the fact that the major intensity reflection presents a half-peak width at least 30% greater that the one of the major intensity reflection which appears in the spectrum of the nonactivated Mg halide. The most active forms are those in which the halo appears in the X-ray spectrum of the component.

Among the magnesium halides, the chloride is the preferred compound. In the most active forms of the magnesium chloride, the X-ray spectrum of the catalyst component shows a halo in place of the reflection which in the nonactivated chloride spectrum appears at the distance of 2.56 Å.

The Al-alkyl compounds used as co-catalysts comprise the Al-trialkyls, such as Al-triethyl, Al-triisobutyl, Al-tri-n-butyl and linear or cyclic Al-alkyl compounds containing one or more Al atoms bonded by O or N atoms, or SO$_4$ and SO$_3$ groups. Examples of said compounds are:

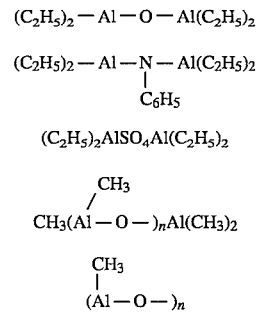

wherein n is a number from 1 to 20.

AlR$_2$OR$'$ compounds, where in R$'$ is an aryl radical substituted in one or more positions and R is a 1–6 carbon alkyl radical can also be used, as well as AlR$_2$H compounds where R has the meaning defined above.

The Al-alkyl compound is generally used in Al/Ti ratios ranging from 1 to 1000.

The electron-donor compounds that can be used as external donors (added to the Al-alkyl compound) include aromatic acid esters such as alkyl benzoates, and in particular silicon compounds containing at least one Si-OR (R=hydrocarbon radical), 2,2,6,6-tetramethylpiperidene and 2,6-diisopropylpiperidene bond. Examples of silicon compounds are (tert-butyl)$_2$-Si(OCH$_3$)$_2$, (cyclohexyl)$_2$Si(OCH$_3$)$_2$, (phenyl)$_2$-Si(OCH$_3$)$_2$.

1,3-diethers having the formula described above can also be used advantageously. If the internal donor is one of these diethers, the external donors can be omitted.

The polymerization process can be carried out in continuous or in batch mode, according to known techniques and operating in liquid phase, in the presence or absence of inert diluent, or in gas phase, or in mixed liquid-gas phases. It is preferable to operate in gas phase.

Reaction time and temperature are not critical; however, it is best if the temperature ranges from 20° to 100° C. The regulation of the molecular weight-is carried out by using known regulators such as hydrogen, in particular.

The catalysts can be precontacted with small quantities of olefins (prepolymerization), thus improving both the performance of the catalysts and the morphology of the polymers. Prepolymerization is carried out maintaining the catalyst in suspension in a hydrocarbon solvent (hexane or heptane, for example) and polymerizing at a temperature from ambient to 60° C. for a time sufficient to produce quantities of polymer from 0.5 to 3 times the weight of the solid catalyst component. It can also be carried out in liquid propylene, at the temperature conditions indicated above, producing quantities of polymer which can reach up to 1000 g per g of catalyst component.

As mentioned above, blends of components (A), (B) and (C) can be prepared directly in polymerization. For this purpose, the polymerization is carried out in at least three consecutive stages, one for each of the above mentioned components, operating in each stage after the first in the presence of the polymer and the catalyst coming from the preceding stage.

It is best to conduct all polymerization stages in gas phase. Component (D),-preferably talc, is then added to the blend.

The blending is done using known techniques starting from pellets, or powders, or particles of the polymers obtained from the polymerization process, which are preferably pre-mixed with component (D) in the solid state (with a Banbury, Henshel or Lodige mixer, for example) and then extruded.

The compositions obtained in this manner are particularly suitable for the manufacture of bumpers and other automotive parts wherein a high balance of stiffness and impact strength is required.

The following example is given in order to illustrate and not limit the present invention.

PREPARATION OF (A), (B), AND (C) BLEND

Preparation of the catalyst

The solid catalyst component used in the present example is prepared as follows.

In inert atmosphere are introduced, in a reactor equipped with agitator, 28.4 g of MgCl$_2$, 49.5 g of anhydrous ethanol, 100 ml of ROL OB/30 vaseline oil, 100 ml of silicon oil with a Viscosity of 350 cs, and the content is then heated to 120° C. until the MgCl$_2$ is dissolved. The hot reaction mixture is then transferred to a 1500 ml vessel equipped with a T-45 N Ultra Turrax agitator, said vessel containing 150 ml of Vaseline oil and 150 ml of silicon oil. The temperature is maintained at 120° C., while the agitation continues for 3 minutes at 3000 rpm. The mixture is then transferred to a 2 liter vessel equipped with agitator and containing 1000 ml of anhydrous n-heptane cooled to 0° C. The particles obtained are recovered by filtration, washed with 500 ml of n-hexane, and the temperature is gradually increased from 30° to 180° C. in nitrogen flow for a period of time sufficient to reduce the alcohol content from 3 to 2.1 moles per mole of MgCl$_2$.

25 g of the adduct are transferred to a reactor equipped with agitator and containing 625 ml of TiCl$_4$, at 0° C. under agitation, bringing the temperature to 100° C. in the space of one hour. When the temperature reaches 40° C., diisobutyl phthalate is added in such a quantity that the magnesium molar ratio with respect to the phthalate is 8.

The content of the reactor is heated to 100° C. for 2 hours under agitation, and then the solid is allowed to settle. The hot liquid is syphoned out. 550 ml of TiCl$_4$ are added, and the mixture is heated to 120° C. for one hour under agitation. The agitation is interrupted, the solid is allowed to settle, and the liquid is syphoned hot. The solid is washed 6 times with 200 ml of n-hexane at 60° C., and then 3 times at room temperature.

2) Polymerization

The polymerization is carried out in continuous mode, in a series of reactors equipped with devices to transfer the product from one reactor to the one immediately next to it.

In the gas phase, hydrogen and monomers are continuously analyzed and fed in order to maintain constant the desired concentrations.

In the polymerization run a mixture of a triethylaluminum (TEAL) activator and a dicyclopentyldimethoxysilane electron-donor, in such quantities that the TEAL/silane weight-ratio is about 3–5, is contacted with the solid catalyst component, in such a way that the TEAL/TI molar ratio is 5, in a reactor at 0° C. for about 3 minutes.

The catalyst is then transferred to a reactor containing an excess liquid propylene and prepolimerized for 24 min. at 20° C.

The prepolymer is then transferred to the first reactor in gas phase where the homopolymerization of the propylene occurs to obtain-component A). The product thus obtained is then transferred into the second reactor, where ethylene is copolymerized with propylene to obtain component B). Finally, the product of the second reactor is transferred to the third reactor, where the ethylene is copolymerized with 1-butene to obtain component C). The polymerization conditions used in each reactor are shown in Table I; the properties of the products thus obtained are shown in Table II.

The Melt Flow Rate (MFR according to ASTM D 1238 L) of the final product, i.e. the mixture of (A), (B) and (C), is about 15 g/10 min.

TABLE I

| FIRST REACTOR | |
|---|---|
| Temperature, °C. | 76 |
| Pressure, atm | 16 |
| Residence time, hr. | 1.4 |
| H$_2$/C$_3$ (mol.) | 0.2 |
| SECOND REACTOR | |
| Temperature, °C. | 60 |
| Pressure, atm | 14 |
| Residence time, hr. | 0.6 |
| H$_2$/C$_2$ (mol.) | 0.13 |
| C$_2$/(C$_2$ + C$_3$) (mol.) | 0.36 |
| THIRD REACTOR | |
| Temperature, °C. | 70 |
| Pressure, atm | 14 |
| Residence time, hr. | 0.5 |

TABLE I-continued

| $H_2/C_2$ (mol.) | 0.65 |
|---|---|
| $C_4/(C_4 + C_2)$ (mol.) | 0.36 |

TABLE II

| | First reactor | Second reactor | Third reactor |
|---|---|---|---|
| Quantity of polymer produced (% by weight) | 58 | 26 | 16 |
| Propylene content (% by weight) | 100 | 50 | 0 |
| 1-butene content (% by weight) | 0 | 0 | 18 |
| Soluble in xylene at ambient temperature (% by weight) | 2.5 | 80 | 20 |

The final product obtained in the polymerization run described above is blended in a Banbury mixer with talc in the form of particles having an average diameter of 0.5–5 micrometers. The resulting dry blend is then pelletized in a single screw extruder at 220° C. After having added the talc (component (D)), the composition of the polymer is (percentages by weight):
A) 51%
B) 23%
C) 14%
D) 12%

Said composition is injection molded at 220° C. into specimens ASTM D 638/I, on which are determined the following properties:

| Flexural modulus (ASTM D 790) | 1400 MPa |
|---|---|
| Izod at 23° C. (ASTM D 256) | does not break |
| Izod at –30° C. (ASTM D 256) | 80 J/m |

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and Scope of the invention as described and claimed.

We claim:

1. A polyolefin composition, the Izod impact value (ASTM D 256) of which at –30° C. is 70–90 MPa, and the flexural modulus value (ASTM D 790) of which is 1300–1600 J/m, which comprises the following components (all percentages being by weight):
   A) 30–60% of a propylene homopolymer or a copolymer of propylene with ethylene or $C_4$–$C_8$ α-olefins, or their mixtures, containing from 0.5 to 5% ethylene or $C_4$–$C_8$ α-olefins, or their mixtures, up to 5% of said homopolymer or copolymer being soluble in xylene at ambient temperature;
   B) 14–30% of a component comprising a copolymer of propylene with ethylene, said component containing from 40 to 60% of propylene, and 60–99% of said component being soluble in xylene at ambient temperature;
   C) 10–25% of a copolymer of ethylene with a $C_3$–$C_8$ α-olefin, the quantity of said $C_3$–$C_8$ α-olefin being from 10 to 30% of said copolymer, 10–50% of said copolymer being soluble in xylene at ambient temperature; and
   D) 5%–45% of a mineral filler in the form of particles having an average diameter in the from 0.1 to 5 micrometers.

2. The polyolefin composition of claim 1, wherein component A) is a propylene homopolymer, up to 3% of which is soluble in xylene at ambient temperature.

3. The polyolefin composition of claim 1, wherein 70–99% of component B) is soluble in xylene at ambient temperature.

4. The polyolefin composition of claim 1, wherein tHe melt flow rate (ASTM D 1238 L) of the blend of components A), B) and C) is from 5 to 50 g/10 min.

5. The polyolefin composition of claim 1, wherein component (D) is selected from the group consisting of talc, calcium carbonate, silica, clays, diatomaceous earths, titanium oxide and zeolites.

6. A blend of olefin polymers that can be used for the preparation of the polyolefin composition of claim 1, the components of said blend comprising (all percentages being by weight):
   A) 35–70% of a propylene homopolymer or copolymer, up to 5% of said homopolymer or copolymer being soluble in xylene at ambient temperature;
   B) 15%–40% of a component comprising a copolymer of propylene with ethylene, said component containing from 40 to 60% of propylene, and from 60 to 90% of said component being soluble in xylene at ambient temperature; and
   c) 11–30% of a copolymer of ethylene with a $C_3$–$C_8$ α-olefin, the quantity of said $C_3$–$C_8$ α-olefin being from 10 to 30% of said copolymer, and from 10% to 50% of said copolymer being soluble in xylene at ambient temperature.

7. A process for the preparation of the blend of claim 6, comprising forming components A), B) and C) in at least three stages by polymerizing the monomers for each component in the presence of a stereospecific catalyst supported on a magnesium dihalide in active form, the polymerization in the second and third stage being in the presence of the polymer and the catalyst of the preceding stage.

8. The process of claim 7, wherein all the polymerization stages are carried out in gas phase.

9. Articles made substantially from a polyolefin composition of claim 1.

10. Bumpers made substantially from a polyolefin composition of claim 1.

* * * * *